United States Patent
Umeda et al.

[11] Patent Number: 6,144,136
[45] Date of Patent: Nov. 7, 2000

[54] STATOR ARRANGEMENT OF ALTERNATOR FOR VEHICLE

[75] Inventors: Atsushi Umeda, Okazaki; Tsutomu Shiga, Nukata-gun; Shin Kusase, Obu, all of Japan

[73] Assignee: Denso Corporation, Kariya, Japan

[21] Appl. No.: 09/351,180

[22] Filed: Jul. 12, 1999

Related U.S. Application Data

[62] Division of application No. 09/084,244, May 26, 1998.

[30] Foreign Application Priority Data

May 26, 1997 [WO] WIPO .......................... PCTJP9701778
Sep. 26, 1997 [JP] Japan ..................................... 9-279751
Apr. 8, 1998 [JP] Japan ................................. 10-114174

[51] Int. Cl.⁷ ......................................................... H02K 1/12
[52] U.S. Cl. ............................................. 310/254; 29/596
[58] Field of Search ................................... 310/254, 201, 310/184; 29/596

[56] References Cited

U.S. PATENT DOCUMENTS

| | | | |
|---|---|---|---|
| 1,822,261 | 9/1931 | Apple | 310/201 |
| 1,826,295 | 10/1931 | Apple | 310/201 |
| 2,928,963 | 3/1960 | Bertsche et al. | 310/168 |
| 4,870,307 | 9/1989 | Kitamura et al. | 310/54 |
| 5,093,591 | 3/1992 | Kitamura et al. | 310/62 |
| 5,097,167 | 3/1992 | Kanayama et al. | 310/201 |
| 5,691,590 | 11/1997 | Kawai et al. | 310/180 |
| 5,742,498 | 4/1998 | Taniguchi et al. | 363/145 |
| 5,778,512 | 7/1998 | Ichikawa et al. | 21/598 |

FOREIGN PATENT DOCUMENTS

| | | |
|---|---|---|
| 482064 | 2/1917 | France . |
| 1005611 | 4/1957 | Germany . |
| 3704780A1 | 11/1988 | Germany . |
| 48-442 | 1/1973 | Japan . |
| 50-47102 | 4/1975 | Japan . |
| 59-159638 | 9/1984 | Japan . |
| 62-272836 | 11/1987 | Japan . |
| 63-274335 | 11/1988 | Japan . |
| 64-5340 | 1/1989 | Japan . |
| 3-159549 | 9/1991 | Japan . |
| 7-303351 | 11/1995 | Japan . |
| 8-205441 | 8/1996 | Japan . |
| 8-298756 | 11/1996 | Japan . |
| 84-01478 | 4/1984 | WIPO . |
| 92-06527 | 4/1992 | WIPO . |

*Primary Examiner*—Nestor Ramirez
*Assistant Examiner*—Joseph Waks
*Attorney, Agent, or Firm*—Pillsbury Madison & Sutro LLP

[57] ABSTRACT

In a stator of an alternator for a vehicle including a stator core and a multi-phase stator winding, the stator winding is composed of a plurality of conductor segments having a pair of conductor members connected with one another to form a first coil-end group disposed on one axial end of the stator core so that first U-turn portions of the conductor segments are surrounded by second U-turn portions of the conductor segments and a second coil-end group disposed on the other axial end of said stator core so that ends of said conductor segments are connected to form lap windings.

6 Claims, 11 Drawing Sheets

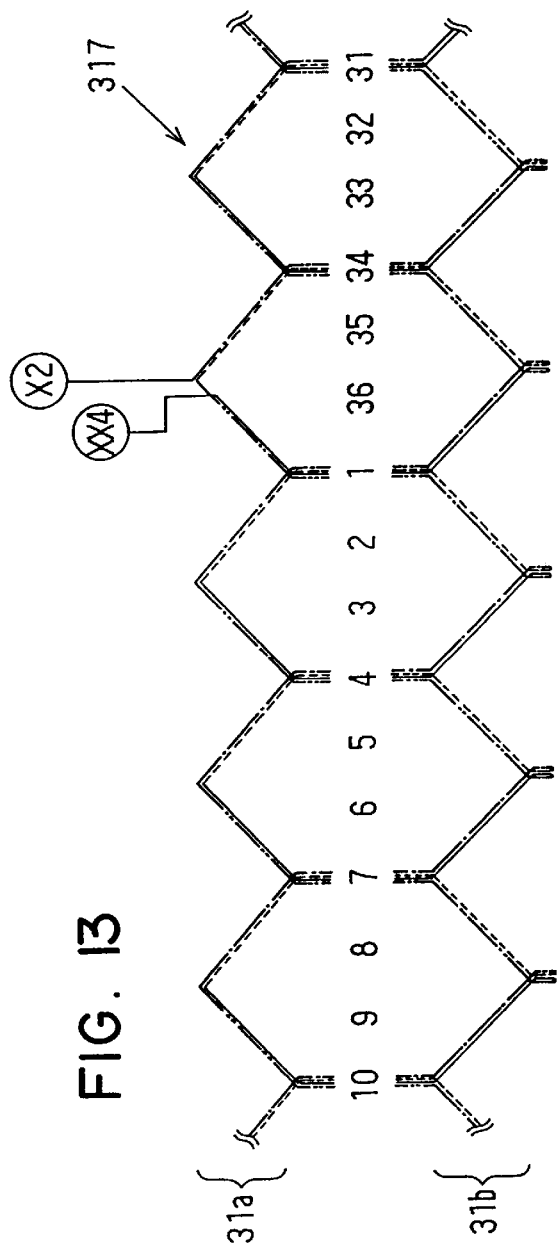
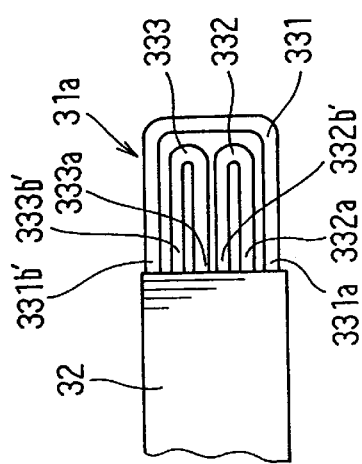
FIG. 13
FIG. 14

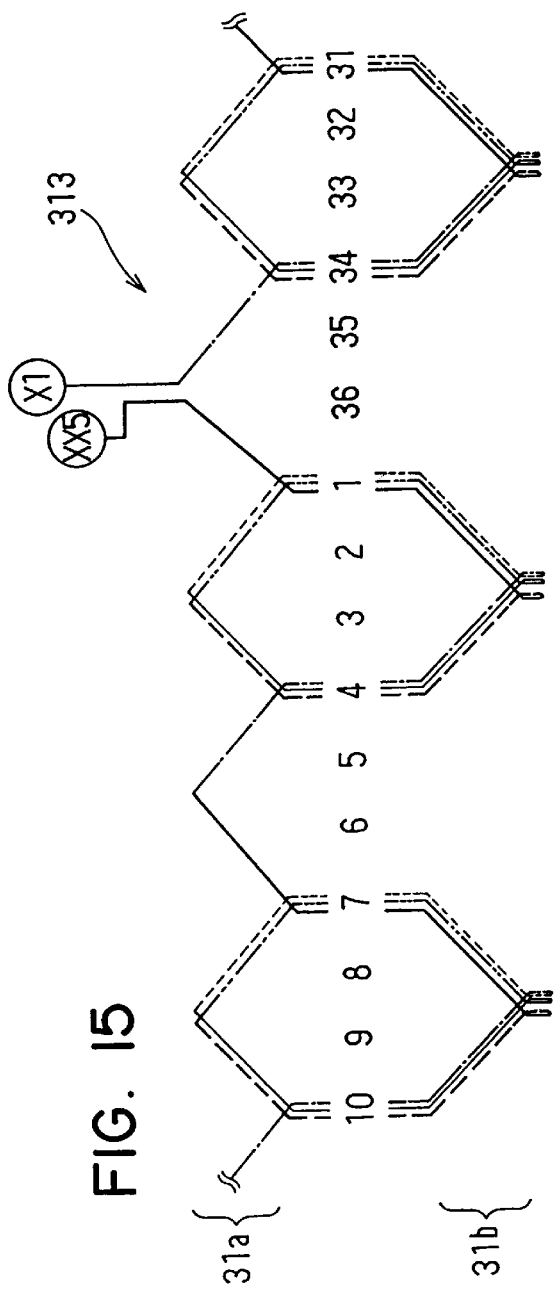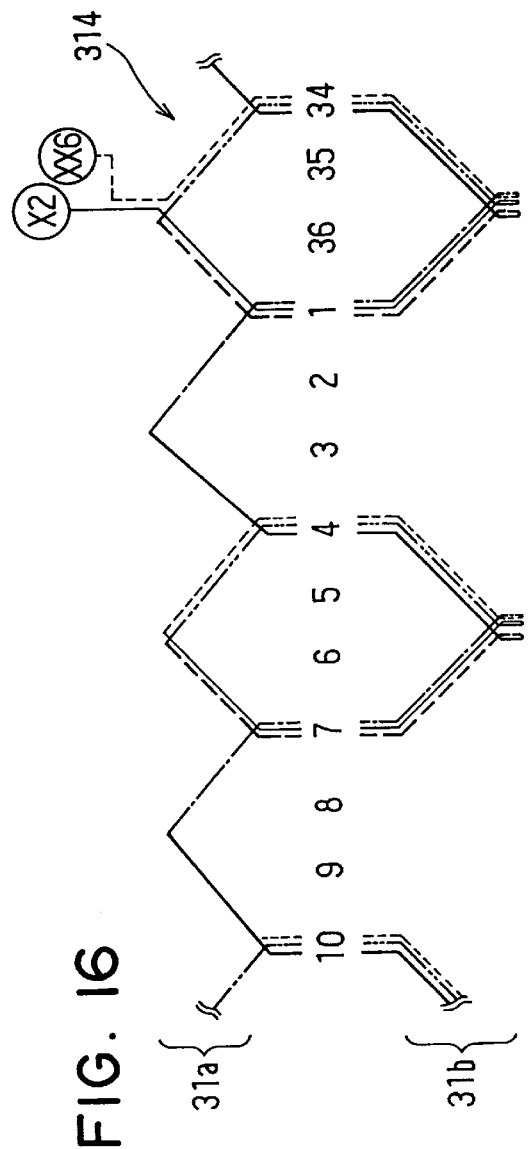
FIG. 15
FIG. 16

6,144,136

STATOR ARRANGEMENT OF ALTERNATOR FOR VEHICLE

This is a division of application Ser. No. 09/084,244, filed May 26, 1998.

BACKGROUND OF THE INVENTION

1. Field of the Invention

The present invention relates to a stator arrangement of an alternator driven by an internal combustion engine for a vehicle such as a passenger car, a truck, or a boat.

2. Description of Related Arts

In a manufacturing process of the stator of an alternator for a vehicle, a plurality of hair-pin like conductor segments (having a turn portion) are inserted into corresponding slots and connected one another instead of winding a continuous wire. Because the above stator needs many joint potions, an automatic wire connection machine is indispensable to reduce the production cost.

Such a stator of an alternator for a vehicle having conductor segments is disclosed in PTC Patent Application 92/06527. The joint portions of a plurality of conductor segments are disposed annularly on one axial end of the stator core, and those are soldered or welded automatically. It is also disclosed that four segments are disposed in a slot, and that segments specific to the joint portions corresponding to the turn-over portions and in-between portions are formed beforehand.

PTC Patent Application 92/06527 discloses as shown in FIG. 21 of this application, a wave winding formed of segments two conductor members of which are respectively disposed in an outer layer and an inner layer in a slot. FIG. 20 shows a winding diagram for one-phase winding. The numerals disposed in a line at the center thereof indicate the slot number. A solid line indicates a conductor member inserted in position A of the slot shown in FIG. 21, a one-dot-chain line indicates a member in position B, a two-dot-chain line indicates a member in position C, and a broken line indicates a member same in position D.

A plurality of the conductor segments includes some base segments 105 having the same length and the same shape. Base segment 105 has two straight conductor members respectively disposed in slots separate at one-pole pitch from each other. One winding is formed from a plurality of the base segments disposed and connected in a regular pattern.

However, such a winding has four conductor members in a slots, thereby forming four wave windings wound around the stator core. In order to connect four windings in series, specific segments different from base segments have to be used. The specific segments of this case include specific segment 100 for connecting the first and second turn windings, specific segment 101 for connecting second and third turn windings and specific segment 102 for connecting the third and fourth turn windings 102.

In order to have two output terminals X1, X2, two specific segments 103, 104 are used.

As a result, in order to form one-phase winding, five different specific segments are necessary. Output terminals X1, X2 are disposed one-pole-pitch separate from each other to avoid interference with the base segments of Y-phase and Z-phase windings because each of output terminals X1, X2 is one of the conductor members inserted in the outer layer in the slot.

Thus, the above conventional winding needs five specific segments to form a one phase winding. In other words, a four-turn winding is formed around the stator core by connecting conductor segments having four conductor members inserted in the same slot in the stator disclosed in PCT Patent Application 92/06527.

The step of inserting the segments in the slots and the step of connecting the ends of the segments for forming one annular winding are the same with all the segments. Another one annular winding is formed in the same slots as the above slots. Other two one annular windings are formed in the slots which are three-slot pitch shifted from the above slots for the first two annular windings. Thus, four annular windings are formed.

In order to form a single four-turn winding by connecting the four annular windings, it is necessary to cut each of annular windings at a portion (four portions in total) and connect the windings with one another at the cut-portions. Therefore, five specific segments—three specific segments for connecting other three annular windings and two specific segments for output terminals—are necessary.

The five specific segments can not be put together at a coil end in a one-pole pitch, because the four annular windings are formed into two groups shifted a three-slot pitch from each other and are not stacked in the radial direction at the coil ends.

If two conductor members (a half of the former number) are inserted in one slot, it is possible to put the specific segments on a coil end in one slot-pitch together. However, reduction in the number of turns can not provides the output voltage of the alternator at a low seed.

FIG. 20 shows conductor members extending from the inner layer are connected to conductor members extending from the outer layer at joint portions 106. Therefore, the conductor members extending from both inner and outer layers of the respective slots are inclined in the same direction, and do not interfere with one another.

In the stator winding disclosed in PTC Patent Application 92/06527, joint portions 106 are disposed annularly on an end of the stator core. Therefore, if the stator is small, intervals between the joint portions become too small for the connection.

Thus, increase in the number of specific segments decrease in the interval between the joint portions make the manufacturing steps of the stator more difficult and the production cost higher.

PTC Patent Application 92/06527 teaches that lap (or loop) windings of the stator winding can be formed from the segments. However, there is not detailed description about it.

The object of the present invention is to provide a stator having a substantial number of conductor members in a slot with a small number of annular windings.

SUMMARY OF THE INVENTION

The present invention is made in view of the above problems and to provide a stator which has windings easily formed of conductor segments.

In more detail, the present invention is to provide a stator which has sufficient number of conductor members in each of slots using few specific segments.

According to a main feature of the invention, a stator winding has a plurality of large-U-shaped conductor segments and small-U-shaped conductor segments connected with one another to form a first coil-end group disposed on one axial end of the stator core so that the small U-shaped conductor segments are surrounded by the large U-shaped conductor segments, and a second coil-end group disposed on the other axial end of the stator core so that ends of said U-shaped conductor segments are respectively connected to form a lap-wound coil for each pole.

BRIEF DESCRIPTION OF DRAWINGS

Other objects, features and characteristics of the present invention as well as the functions of related parts of the present invention will become clear from a study of the following detailed description, the appended claims and the drawings. In the drawings:

FIG. 13 is a portion of a winding diagram of the stator according to the third embodiment;

FIG. 14 is a schematic diagram of a first coil-end group of the stator according to a fourth embodiment of the invention;

FIG. 15 is a portion of a winding diagram of the stator according to the fourth embodiment;

FIG. 16 is a portion of a winding diagram of the stator according to the fourth embodiment;

DETAILED DESCRIPTION OF THE PREFERRED EMBODIMENTS

FIRST EMBODIMENT

Figure 1:
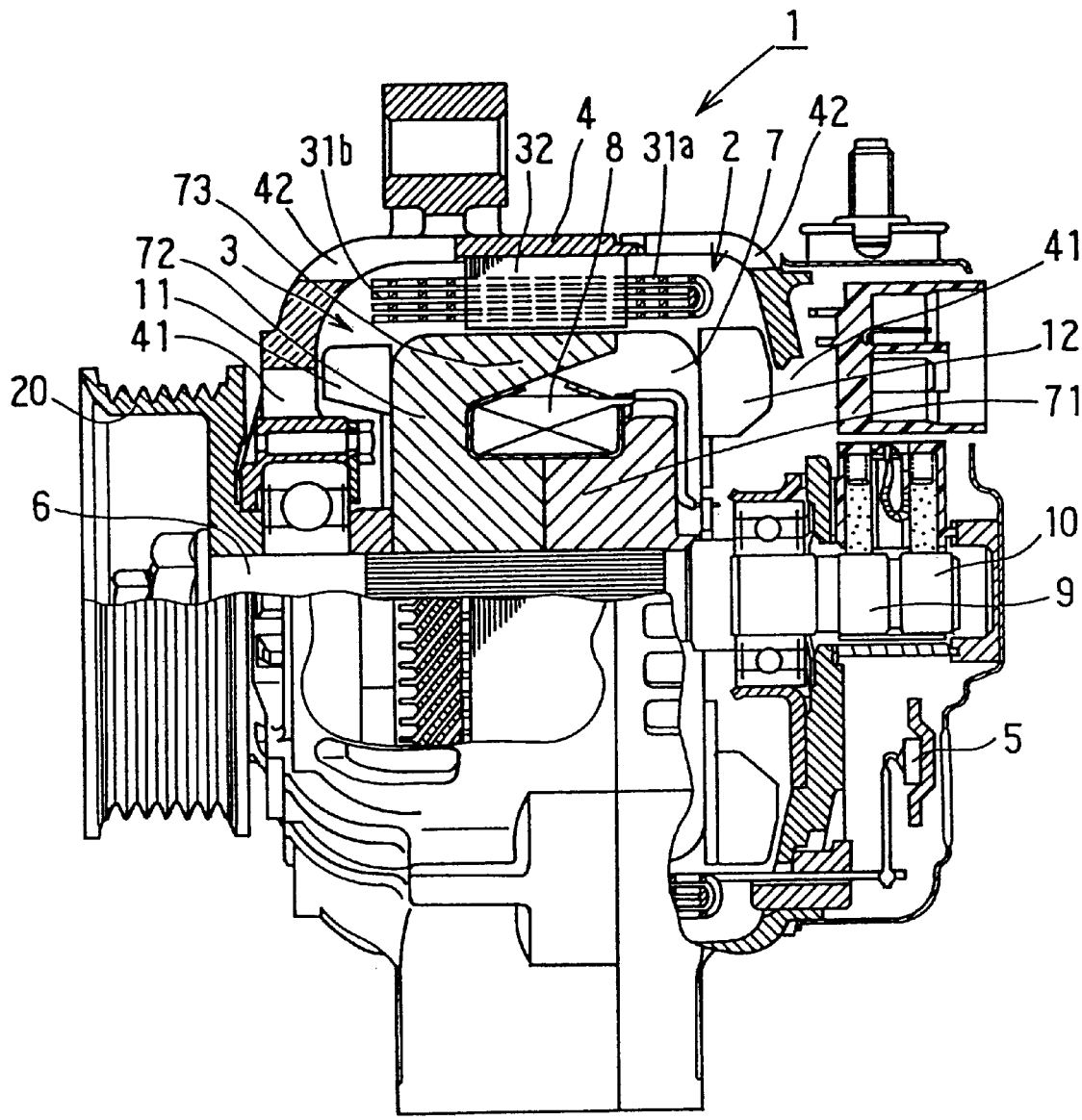
FIG. 1 is a cross-sectional view of an alternator for a vehicle according to a first embodiment of the present invention.

A stator core according to a first embodiment of the present invention is described with reference to FIGS. 1–7.

Alternator 1 is composed of stator 2 functions as an armature, rotor 3 functions as a magnetic field, housing 4 for supporting stator 2 and rotor 3, and rectifier for converting ac power to dc power. Rotor 3 rotates together with shaft 6 and is composed of Lundell type pole core 7, field coil 8, slip rings 9, 10 and cooling fans 11, 12. Shaft 6 is linked with pulley 20 to be driven by an engine (not shown) mounted on a vehicle. Lundell type pole core 7 is composed of a pair of pole core members. Each of the pole core 7 members is composed of boss portion 71 fitted to shaft 6, disk portion 72 extending radially from boss portion 71 and a plurality of claw poles 73.

Air intake windows 41 are formed on an axial end of housing 4, and air discharge windows 42 are formed on the shoulder portions of housing 4 opposite to first coil-end group 31a and second coil-end group 31b.

Stator 2 is composed of stator core 32, a stator winding disposed in slots 35 formed in stator core 32 and insulators 34 for insulating conductor members from stator core 34.

Figure 2:
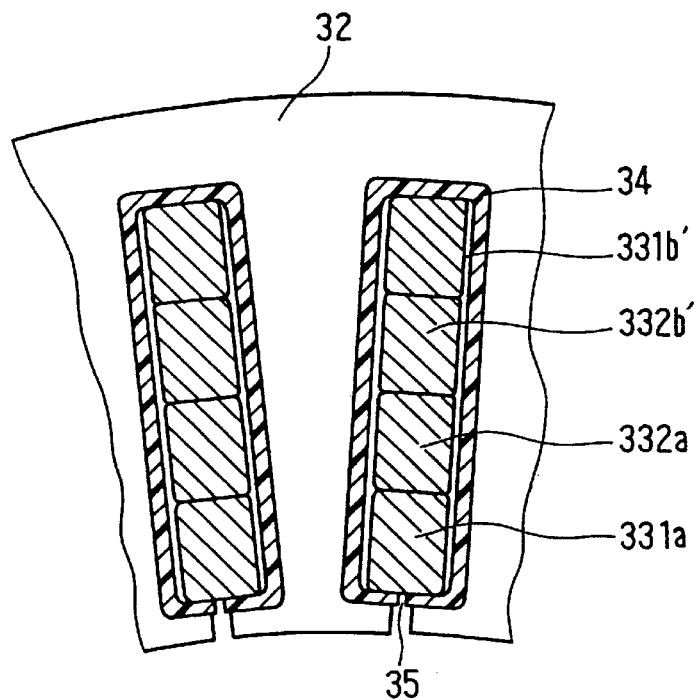
FIG. 2 is a fragmentary view of a stator according to the first embodiment.

As shown in FIG. 2, the stator core 32 has 36 slots formed at equal intervals correspond to the number of poles of rotor 3 in order to accommodate three-phase stator winding.

The stator winding accommodated in slots 35 of stator core 32 is composed of a plurality of conductor segments. Each of the conductor segments has a pair of conductor members, and each of slots 35 has an even number of the conductor members (four conductor members according to this embodiment). Four conductor members in each one of slots 35 are aligned in the radial direction of stator core 32 to form an innermost layer, an inner middle layer, an outer middle layer and an outermost layer. The conductor segments are connected in a prescribed pattern to form the stator winding. The conductor segments form continuous coil ends at one end of stator core 32 and connected coil ends at the other end thereof.

One of the conductor members in one of slots 35 is paired with one of the conductor members in another of slots 35 that is one pole-pitch spaced apart from the former. In other words, one of the conductor members of each of the conductor segments is disposed in one layer in one of slots 35 and the other disposed in another layer in another of slots 35 which is one pole-pitch spaced apart from the former. Thus, conductor segments can be lined up in the coil ends and ensure spaces therebetween.

For example, conductor member 331a of the conductor segment 331 is disposed in the innermost layer in one of slots 35, and conductor member 331b of the same conductor segment 331 is disposed in the outermost layer in another of slots 35 that is one pole-pitch spaced apart from the former. In the same manner, conductor member 332a of conductor segment 332 is disposed in the inner middle layer in one of slots 35, and conductor member 332b of the same segment 332 is disposed in the outer middle layer in another of slots 35 that is one pole-pitch spaced apart from the former in clockwise.

Conductor segments 331, 332 have continuous U-turn portions 331c, 332c respectively.

Thus, at one end of stator core 32, the continuous U-turn portion of the conductor members disposed in the outermost layer and innermost layer surrounds the continuous U-turn portion of the conductor members in the outer middle layer and the inner middle layer. In other words, one of two U-turn portions of conductor segments disposed in the same slots surrounds the other of the U-turn portions at one end of stator core 32. each of the conductor segment having a pair of the conductor members disposed respectively in the outer middle layer forms an inner coil end, and each of the conductor segment having a pair of the conductor members disposed respectively in the outermost layer and the innermost layer forms an outer coil end.

On the other hand, conductor member 332a of conductor segment 332 disposed in the inner middle layer in one of slots 35 is paired with conductor segment 331a' of different conductor segment 331 disposed in the innermost layer in another of slots 35 that is one pole-pitch spaced apart clockwise therefrom. In the same manner, conductor member 331b' of conductor segment 331 disposed in the outermost layer in one of slots 35 is also paired with conductor member 332b of conductor segment 332 disposed in the outer middle layer in another of slots 35 that is one pole-pitch spaced apart clockwise therefrom. These paired conductor members are respectively welded together at the other end of stator core 32.

Therefore, joint potions of the conductor members in the outermost layer and the conductor members in the outer middle layer and joint portions of the conductor members in the innermost layer and the conductor members in the inner middle layer are aligned in a circumference of the other end of stator 32. The joint portions of the conductor members in the outermost layer and those in the outer middle layer and the joint portions of the conductor members in the innermost layer and those in the inner middle layer form contiguous-layer-coil-ends.

Thus, the paired conductor members are arranged so that the members do not interfere with one another on the other end of stator core 32.

Figure 3:
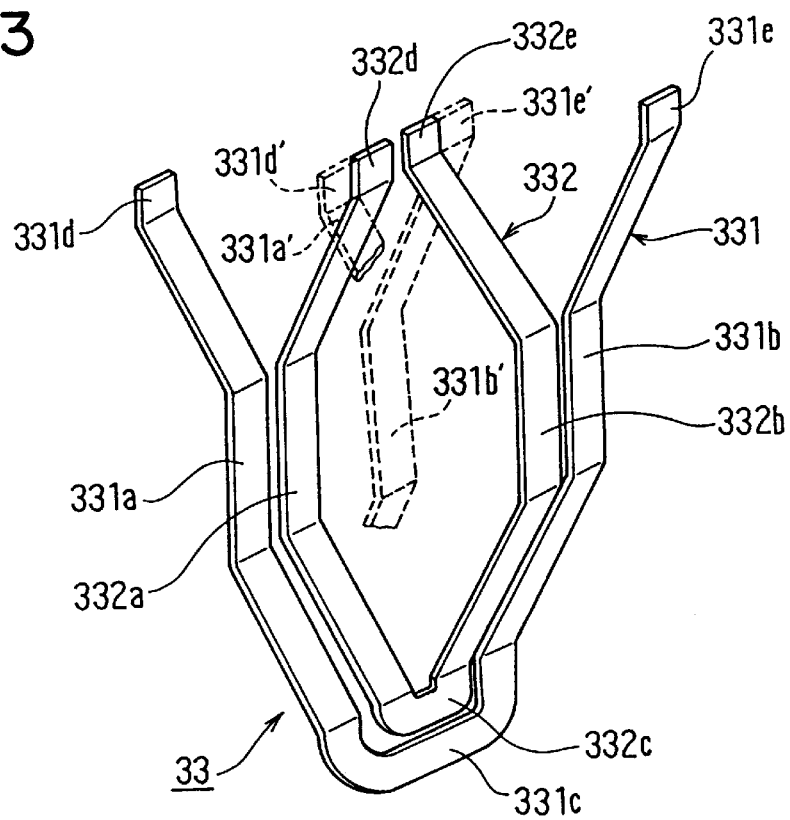
FIG. 3 is a schematic view of a conductor segment according to the first embodiment.

Each of the conductor members is a portion of a certain-shaped conductor segment having a rectangular cross-section. As shown in FIG. 3, one of the conductor members in the innermost layer and one of the conductor members in the outermost layer form a large U-shaped conductor segment 331c. One of the conductor members in the inner middle layer and one of the conductor members in the outer middle layer form a small U-shaped conductor segment 332c. The large and small conductor segments are the base segments 33. The base segments are disposed in the slots in a prescribed rule to form a winding turning two times around stator core 32. The shapes of the segments for terminals of the winding and for connecting the first turn and the second turn of the winding are specific. Three specific segments are necessary in this embodiment. The first turn of the winding and the second turn of the same are connected between the outermost layer and outer middle layer and between the innermost layer and inner middle layer, thus forming specific coil ends.

X-phase winding of three phase windings is described with reference to FIGS. 4, 5 and 6. The conductor members disposed in the outermost layer are indicated by one-dot chain lines, the conductor members disposed in the outer middle layer are indicated by broken lines, the conductor members disposed in the inner middle layer are indicated by solid lines, and the conductor members disposed in the innermost layer are indicated by two-dot chain line.

First coil-end group 31a is shown on the upper side of the diagrams, and second coil-end group 31b is shown on the lower side of the diagrams. The reference numerals aligned in the center lateral line indicate the slot numbers. The reference numerals for other phase-windings are the same.

Figure 4:
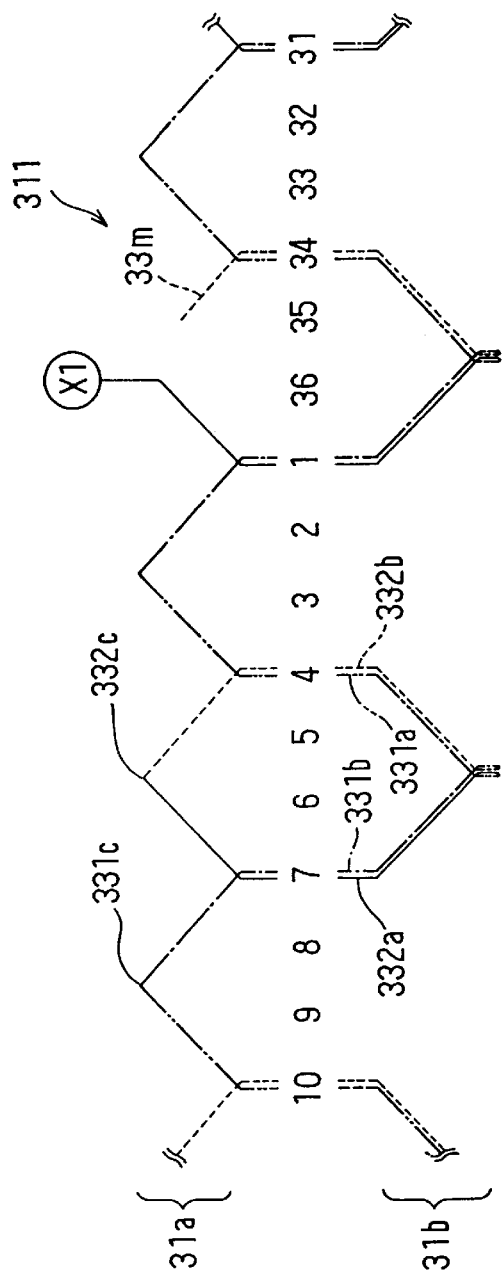
FIG. 4 is a portion of a winding diagram of the stator according to the first embodiment.

As shown in FIG. 4, each of base segments 33 is inserted in every fourth slot from slot "1". In second coil-end group 31b, an end of the conductor member extending from the outer middle layer in one of slots 35 is connected to the end of the conductor segment extending from the outermost layer of another of slots 35 spaced apart clockwise one pole-pitch therefrom. An end of the conductor member extending from the innermost layer of one of slots is also connected to the end of the conductor member extending from the inner middle layer in one of slots 35 spaced apart clockwise one pole-pitch therefrom. Thus, first winding 311, which has a two-turn lap wound coil per pole, is formed.

Figure 5:
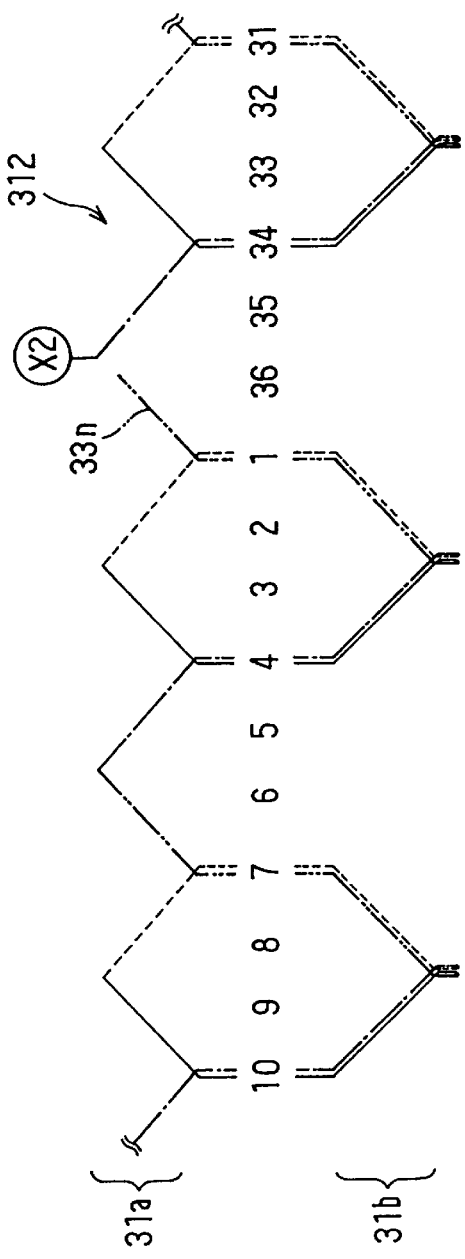
FIG. 5 is a portion of a winding diagram of the stator according to the first embodiment.
Figure 6:
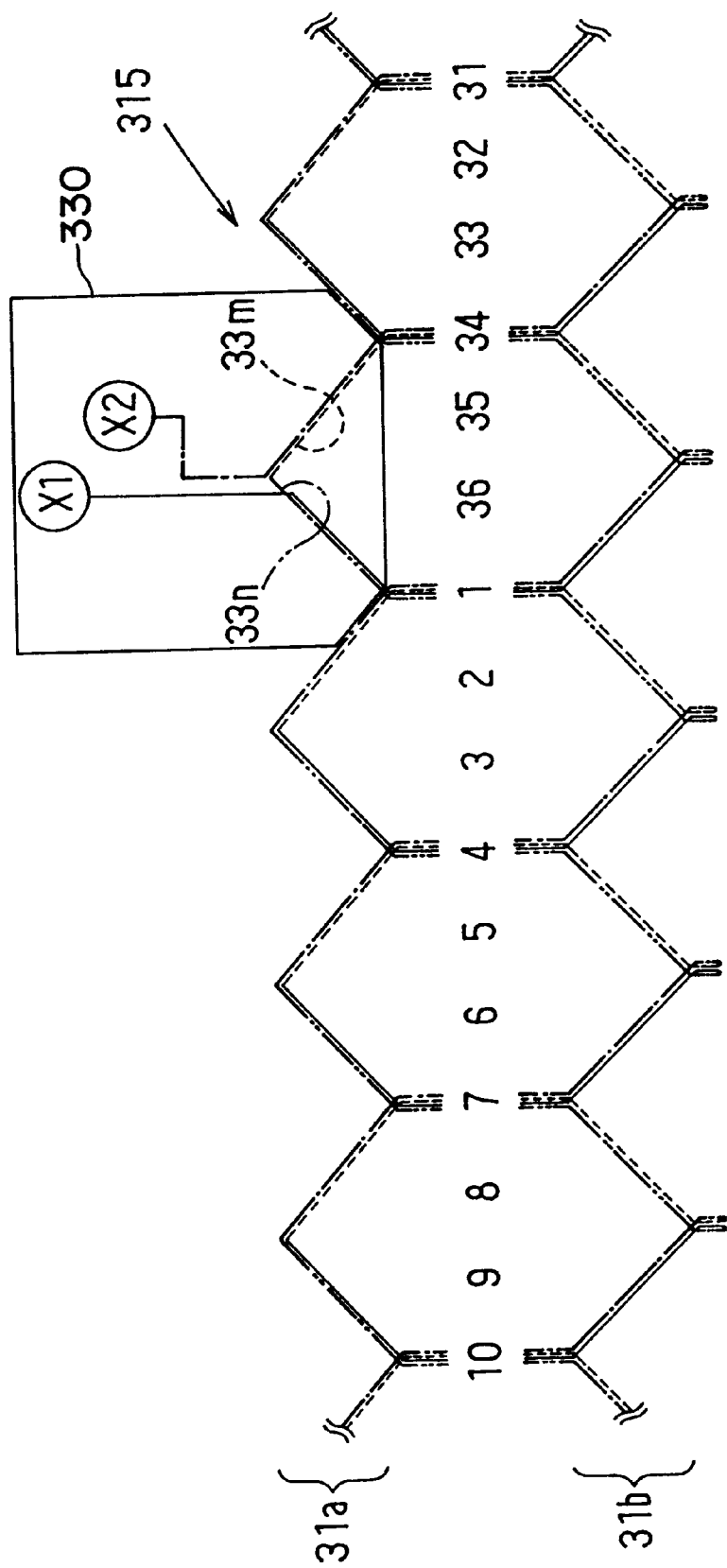
FIG. 6 is a portion of a winding diagram of the stator according to the first embodiment.

In the same manner, as shown in FIG. 5, second winding 312 is formed.

Windings 311 and 312 shown in FIGS. 4 and 5, are connected at end 33m of first winding 311 and end 33n of second winding 312, thereby forming four-turn winding 315 having a four-turn coil each pole.

The conductor segment having joint portion of end 33m of first winding 311 and end 33n of second winding 312 is in shape different from large base segment 311 and small base segment 312.

X-phase winding has three specific segments: the segment having joint portion of end 33m of first winding 331 and end 33n and second winding 332, the segment having terminal X1 and the segment having terminal X2. The number of the specific segments can be reduced in the manner explained below.

First winding 311 shown in FIG. 4 is formed by cutting one of U-turn portions 332c of small segments 332 of the annular winding wound in a prescribed rule that is inserted in slot "1" and slot "34".

In the same manner, second winding 312 is formed by cutting one of U-turn portions 331c of large segments 331 of the annular winding wound in a prescribed rule that is inserted in slot "1" and slot "34". One of cut portions of U-turn portion 331c and one of cut portions of U-turn portion 332c are connected in series, and the other cut portions of both U-turn portion 331c and U-turn portion 332c are formed to terminals of the winding, thereby forming winding 315. Thus, two annular windings are cut respectively and are rearranged to form a four-turn lap winding 315 with only three specific segments.

Figure 7:
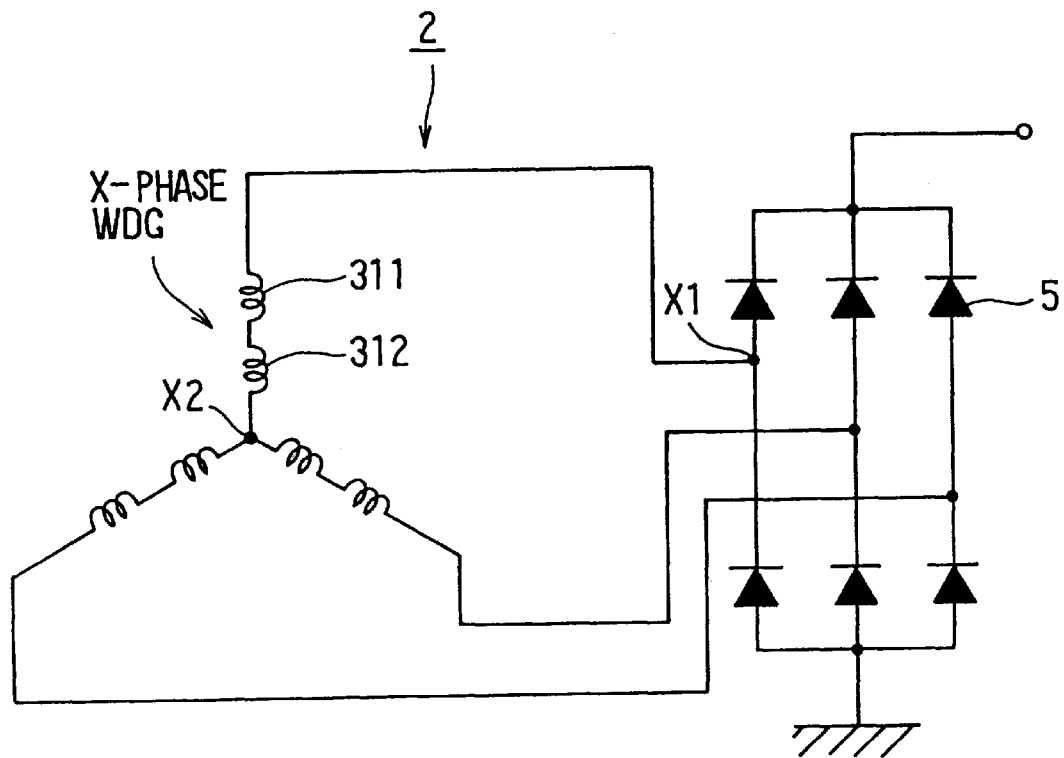
FIG. 7 is a circuit diagram according to the first embodiment.

The specific segments can be disposed together in a one pole-pitch space of first coil-end group. In the same manner, Y-phase winding and Z-phase winding in those of slots 35 which are 120 degree in angle different from one another are formed. Terminal X1 of X-phase winding as well as terminals Y1, Z1 of Y-, Z-phase windings are connected to rectifier 5, and terminals X2 and other terminals Y2, Z2 (not shown) are connected together to a neutral point. As shown in FIG. 7, the three phase-windings are connected in the star connection. The winding shown in FIG. 6 has terminal X1 extending axially from the side of first coil-end group 31a.

A manufacturing process of the stator winding is described hereafter. Base segments 33 are disposed so that each of U-turn portions of U-shaped large segments surrounds one of U-turn portions 332 of U-shaped small segments 332 and are inserted to the respective slots of stator core 32 from the same side thereof. Conductor members 331a of large segments 331 are disposed in the innermost layer of slots 35, conductor members 332a of small segments 332 are disposed in the inner middle layer, conductor members 331b of large segments 331 are disposed in the outermost layer in the slots which are one pole-pitch spaced apart clockwise from the above-said slots, and conductor members 332b of small segments 332 are disposed in the outer middle layer in the slots which are one pole-pitch spaced apart from the above-said slots 35.

As a result, straight portions of conductor members 331a, 332a, 332b, 331b, are lined up as shown in FIG. 2. Conductor members 332*b*, 331*b*, are paired with conductor members of large and small segments disposed in the slot that is one pole-pitch spaced apart therefrom.

Thereafter, in second coil-end group 31*b*, the conductor members in the outermost layer and the innermost layer are bent to separate from each other so that each of joint portions 331*d*, 331*e* is inclined to cover 1.5 slots. The conductor members in the inner middle layer and the outer middle layer are also bent to close to each other so that each of joint portions 332*d*, 332*e* is inclined to cover 1.5 slots.

The above steps are repeated for all conductor segments 33 in slots 35. In second coil-end group 31*b*, joint portion 331*e*, of the conductor member in the outermost layer and joint portion 332*e* of the outer middle layer, and also joint portion 332*d* of the conductor member in the inner middle layer and joint portion 331*d*, of the conductor member in the innermost layer are welded by an ultrasonic wave welder or an arc welder, or soldered for electric connection.

The conductor segments are formed from copper plates into the U-shapes by a press machine. A set of the large segment and the small segment can be formed separately or jointly. The conductor segments can be formed from a flat type wire by bending. The shape of the U-turn portion can be changed to an arc-shape.

According to the above-described structure, the conductor members in the same layer of the first coil-end group 31*a* and the second coil-end group 31*b* are inclined in the same direction. Accordingly, the conductor segments in the same layer lap winding 315 which has four conductor members each slot can be provided without interference. The specific segments are limited to three each phase.

All the joint portions can be gathered in second coil-end group 31*b*, and, therefore, the work time can be reduced. On the other hand, a plurality of joint portions can be distributed annularly at equal intervals. Accordingly, sufficient distance between joint portions can be maintained, and connection work such as welding can be made easy. For example, positioning of a welder or the like can be carried out easily so that the productivity can be increased.

Because large segments 33 surround small segments 332 to form double turn-coils, both can be formed at the same time and inserted into slots together, thereby providing high productivity.

In addition, different-shaped-specific segments can be gathered in one pole-pitch of first coil-end group 31*a* to increase the productivity.

Thus, the conductor segments and the stator winding can be manufactured at a high productivity and low cost.

SECOND EMBODIMENT

More conductor members in each slot than four conductor members of winding 315 of the first embodiment can be provided according to the following second to four embodiments.

A plurality of windings 316 each of which has four conductor members in each slot can be put on winding 315 of the first embodiment in the radial direction to form a series-connected winding.

Figure 8:
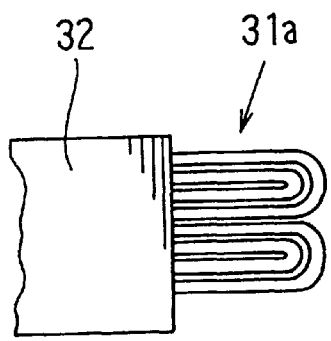
FIG. 8 is a schematic diagram of a first coil-end group of the stator according to a second embodiment of the invention.
Figure 9:
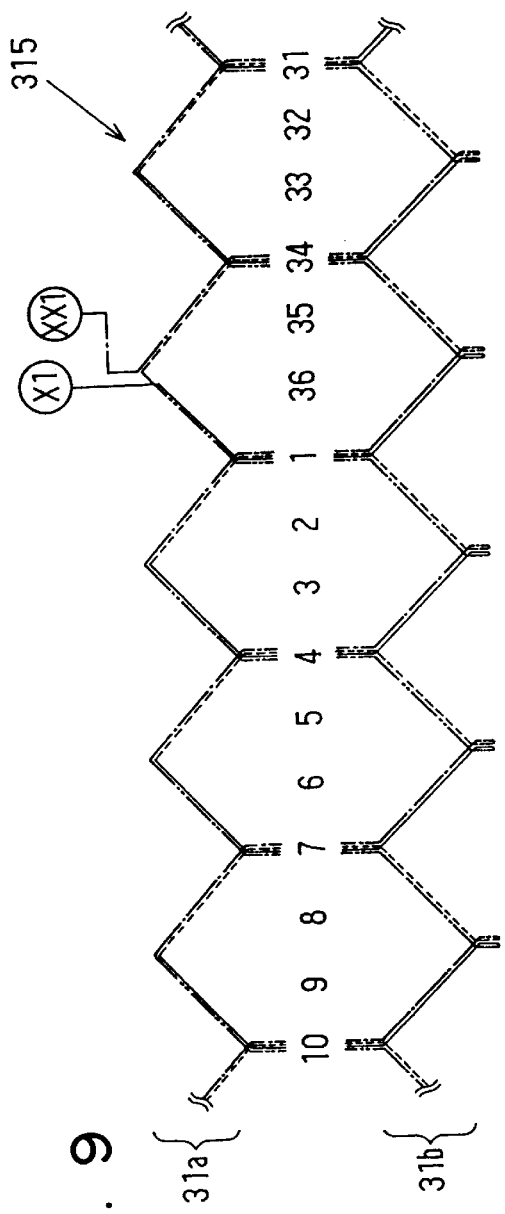
FIG. 9 is a portion of a winding diagram of the stator according to the second embodiment.
Figure 10:
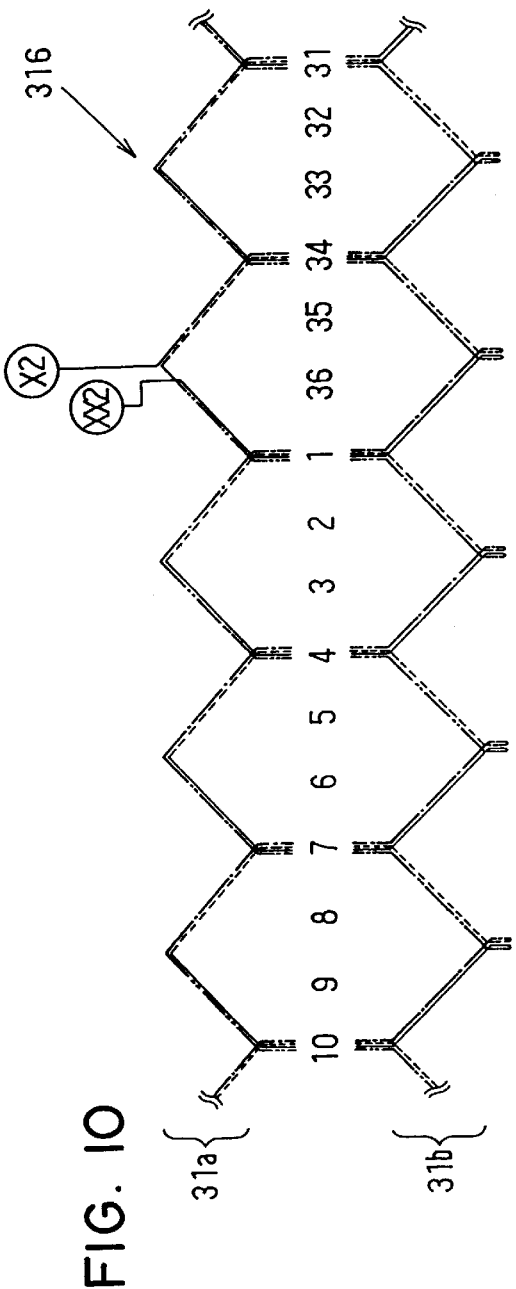
FIG. 10 is a portion of a winding diagram of the stator according to the second embodiment.

First coil-end group 31*a* having 8 conductor members in each of slots 35 is shown in FIG. 8, and a winding diagram of X-phase winding is shown in FIGS. 9 and 10. FIG. 9 shows the conductor members disposed in four layers: outermost first layer indicated by one-dot chain lines, second layer by broken lines, third layer by solid lines and fourth layer by two-dot chain lines. FIG. 10 shows the conductor members disposed in fifth to eighth layers: fifth layer by one-dot chain lines, sixth layer indicated by broken lines, seventh layer by solid lines and eighth layer by two-dot chain lines. The windings shown in FIGS. 9 and 10 are manufactured in the same manner as the first embodiment. Winding ends XX1 and XX2 are connected by a conductor segment having a U-turn portion to form a series-connected winding.

All the joint portions can be gathered in second coil-end group 31*b* to improve the productivity. On the other hand, the joint portions can be distributed on the four-turn annular winding at equal intervals. Thus, the connection can be carried out as easily as the first embodiment. Although this embodiment needs five specific segments, those specific segments can be gathered in one pole-pitch area of first coil-end group 31*a* as in the first embodiment.

THIRD EMBODIMENT

A plurality of winding 315 according to the first embodiment, which has four conductor members in each of slots 35, are surrounded by winding 317.

Figure 11:
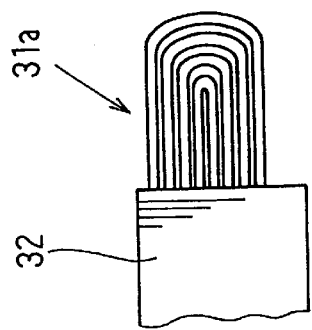
FIG. 11 is a schematic diagram of a first coil-end group of the stator according to a third embodiment of the invention.
Figure 12:
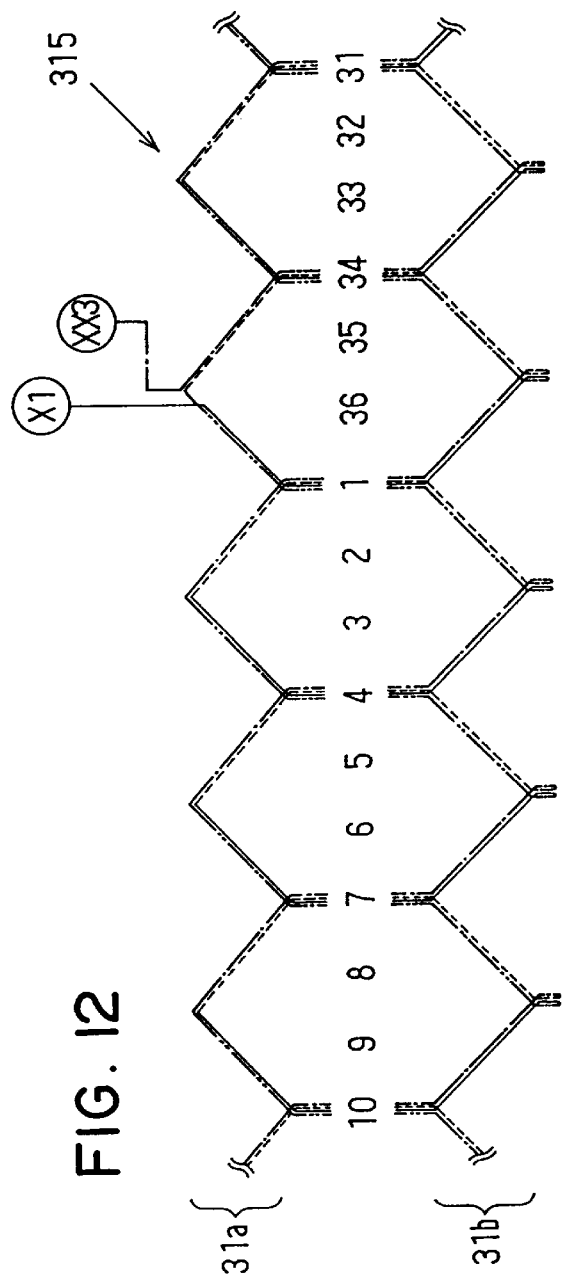
FIG. 12 is a portion of a winding diagram of the stator according to a the third embodiment.

The conductor members disposed in the outer two layers, the conductor members disposed in the inner two layers and two conductor members disposed side by side are combined to form a plurality of the same windings as the first embodiment, and are connected in series. FIG. 11 is a schematic diagram showing a portion of first coil-end group 31*a* which has 8 conductor members in each slot. FIGS. 11 and 12 show a winding diagram of X-phase winding. FIG. 12 shows the conductor members disposed in the third to sixth layers, and FIG. 13 shows the conductor members disposed in the first, second, seventh and eighth layers.

In FIG. 12, the conductor members disposed in the third layer from the outermost layer are indicated by one-dot chain lines, the conductor members in the fourth layer are indicated by broken lines, the conductor members in the fifth layer by solid lines and the conductor members in the sixth layer by two-dot chain lines. In FIG. 13, the conductor members disposed in the first layer that are the outermost layer are indicated by one-dot chain lines, the conductor members in the second layer by broken lines, conductor members in the seventh layer by solid lines and conductor members in eighth layer by two-dot chain line. The winding shown in FIGS. 12 and 13 is manufactured in the same way as the first embodiment. Winding ends XX3 shown in FIG. 12 and XX4 shown in FIG. 13 are connected by a conductor segment having a U-turn portion to form a series-connected winding.

Thus, all the joint portions can be gathered in second coil-end portion 31*b*, thereby improving the productivity. On the other hand, the joint portions can be distributed on the four-turn annular winding at equal intervals. The connection can be carried out as easily as the first embodiment. Although this embodiment needs five specific segments, those specific segments can be gathered in one pole-pitch area of first coil-end group 31*a* as in the first or second embodiment.

FOURTH EMBODIMENT

Instead of the winding according to the first embodiment which has four conductor members in each slot, a stator winding that has six conductor members in each slot can be provided by two U-shaped small segments 332, 333 disposed in the radial direction and U-shaped large segment 331 surrounding small segments 332, 333.

FIG. 14 is a schematic diagram showing a portion of first coil-end group 31*a* which has conductor members disposed respectively in the first from the outermost, second, third, fourth, fifth and sixth layers. Conductor members 331a, 331b' extending from the first and sixth layers form a U-turn portion. Conductor members 332a, 332b' extending the second and third layers and conductor members 333a, 333b' extending from the fourth and fifth layers form respective U-turn portions. FIGS. 15 and 16 show a winding diagram of X-phase winding.

In FIGS. 15 and 16, the conductor members in the outermost first layer are indicated by one-dot chain lines, the conductor members in the second layer are indicated by thin broken lines, the conductor members in the third layer are indicated by thin solid lines, the conductor members in the fourth layer are indicated by two-dot chain lines, the conductor members in the fifth layer are indicated by thick broken lines, and the conductor members in the sixth layer are indicated by thick solid lines. Each of first winding 313 shown in FIG. 15 and second winding 314 shown in FIG. 16 is a lap winding having three conductor members in each slot. Winding ends XX5 shown in FIG. 15 and XX4 shown in FIG. 16 are connected by a conductor segment having a U-turn portion to form a series-connected winding.

Thus, second coil-end group 31b has joint portions disposed regularly to improve the productivity. On the other hand, the joint portions can be distributed on the three-turn annular winding at equal intervals so that the connection can be carried out easily.

Each phase-winding has three specific segments: a specific segment having a joint portion between terminal XX5 of first winding 313 and terminal XX6 of second winding 314, a specific segment having terminal X1, and a specific segment having terminal X2. These specific segments can be gathered in one pole-pitch area of first coil-end group 31a as in the first or second embodiment.

OTHER EMBODIMENTS

The specific segment for connecting first winding 311 and second winding 322 can be used to connect the conductor member in the outermost layer and the conductor member in the inner middle layer instead of the specific segment for connecting the conductor member in the innermost layer and the conductor member in the inner middle layer according to the first embodiment. In this case, the conductor members in the innermost layer and in the outer middle layer are extended as lead wires.

Rod-like segments can be inserted in slots 35 and connected thereafter, instead of U-shaped small segments 332 and U-shaped large segments 331 having continuous U-turn portion 331c surrounding small segments 332. In this case, the winding can be formed by connecting each of the conductor members of both first and second coil-end groups. The joint portions in one coil-end group are disposed on the two annular layers, and the joint portions in the other coil-end group are disposed so that the joint portions of the conductor members in the inner middle layer in the slots and the conductor members in the outer middle layer in the slots are surrounded by the joint portions of the conductor members in the outermost layer and the innermost layer.

As a variant, the joint portions of the conductor members of the outer middle layer and the conductor members of the inner middle layer in the one coil-end group are surrounded by the joint portions of the conductor members in the outermost layer and the innermost layer, and the conductor members of the outermost layer and outer middle layer as well as the conductor members of the innermost layer and the inner middle layer are connected by continuous wires.

The extension wire can be disposed on the side of second coil-end group instead of one of the above first to fourth embodiments that has the extension wires on the side of first coil-end group 31a.

If the number of conductor members in each slot is 6+4N (N is an integer) like the fourth embodiment where six conductor members are inserted, the conductor members in the outermost layer and the innermost layer are connected by the U-turn portions. Therefore, the same winding structure can be provided by connecting the radially aligned conductor members in the layers by the U-turn portions.

Even if the number of poles and the slots is changed, the same winding structure as the above embodiments, each of which has 12 claw poles and 36 slots can be provided. For example, the number of the slots can be doubled to have two three-phase windings to have combined output.

Figure 17:
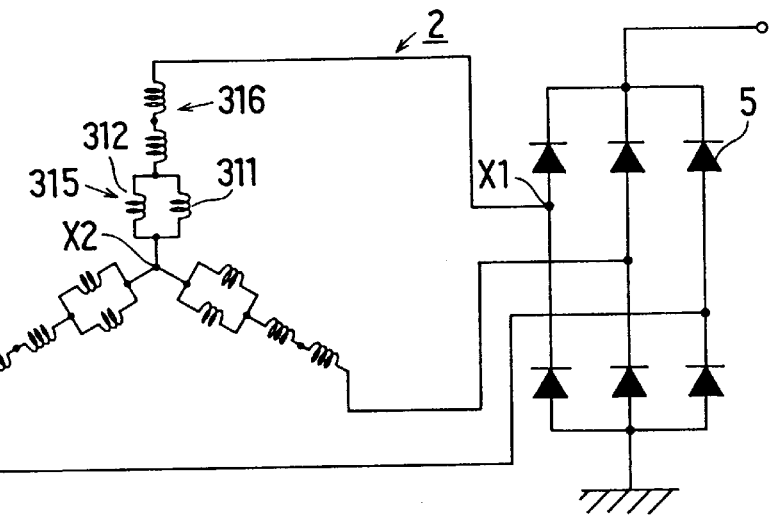
FIG. 17 is a circuit diagram according to another embodiment of the invention.

A plurality of annular windings can be connected in series, in parallel or in combination thereof to provide output characteristics required for a vehicle. FIG. 17 shows a sample of one of the connection of a stator having 8 conductor members in each slot. In the second embodiment, end 33m of first winding 311 and end 33n of second winding 312 are formed from rod-like segments so that first winding 311 and second winding 312 can be connected in parallel with each other. The parallel windings are connected in series with windings having four conductor members in each slot to form one of the phase windings.

Figure 18:
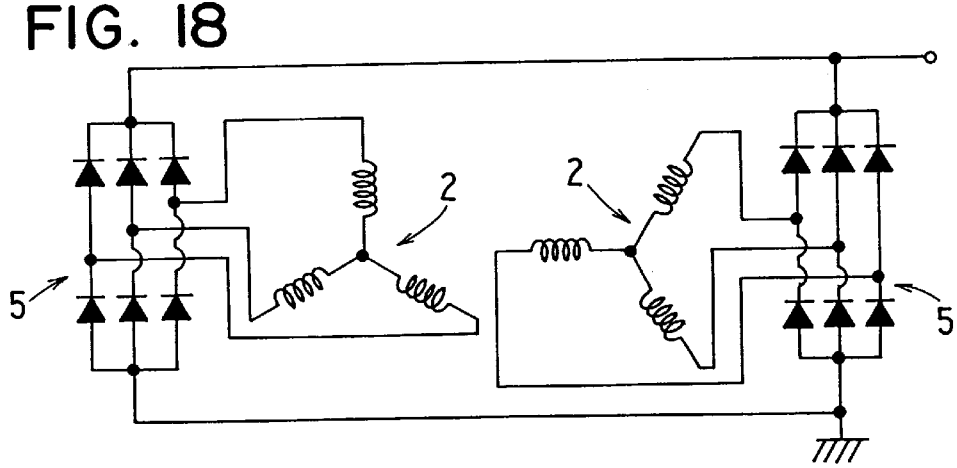
FIG. 18 is a circuit diagram according to another embodiment of the invention.

If a pair of the same phase-windings is formed for each phase, two star-connected windings and respective rectifiers are available to have dc power as shown in FIG. 18.

Figure 19:
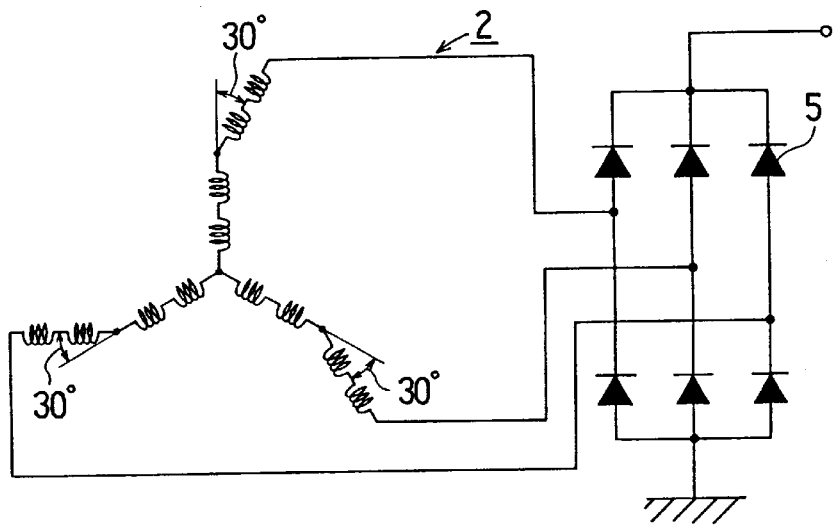
FIG. 19 is a circuit diagram according to another embodiment of the invention.
Figure 20:
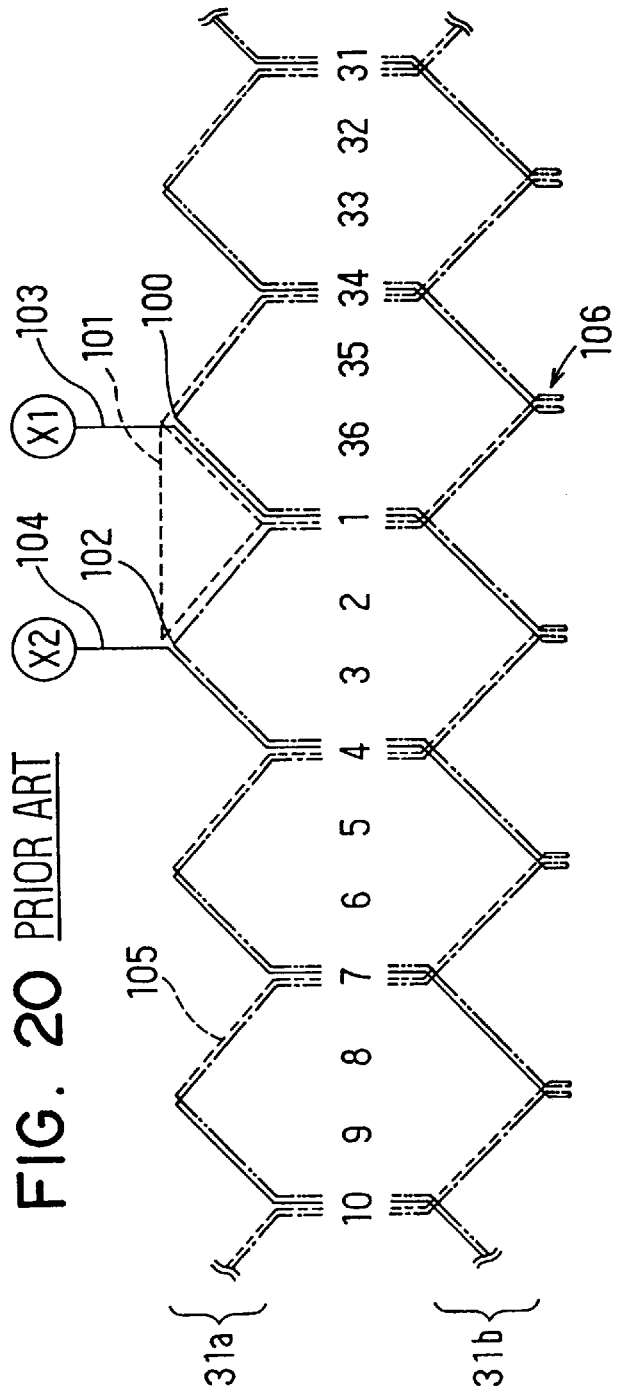
FIG. 20 is a winding diagram of a conventional stator.
Figure 21:
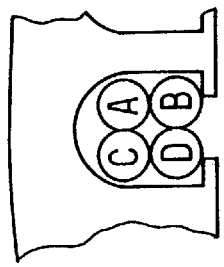
FIG. 21 is a diagram of a portion of a conventional stator having conventional conductor members disposed in a slot.

In the above embodiment, the stator core has 36 slots. However, the same windings can be formed for the stator having twice as many slots as the above, as shown in FIG. 19. The embodiment shown in FIG. 19 has windings which has 30° in electric angle different from the other phase-windings and are connected in series therewith. The 30°-different windings are formed in the same way as the windings of the previous embodiments. The 30°-different windings can be star-connected separately from the other phase windings to be connected to a specific rectifier so that the dc current can be added to the dc power provided by the other phase-windings. The same structure can be applied to the stator having three times as many slots as the above.

A stator having delta-connection of X, Y, Z-windings can be provided instead of the above star-connection of X, Y, Z-windings also. Such star-connection and delta-connection can be combined if two or more rectifiers are used.

The number of specific segments is one more than the number of annular windings such as winding 311, 312, 313 or 314 as described in the first to fourth embodiments. Each of the above annular windings has a plurality of turns and limited number of the specific segments.

In the above embodiments, the conductor segments are formed from flat wires. However, round wire can be used if the straight portions of conductor members 331a, 331b, 332a, 332b are formed to be flat.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A stator of an alternator for a vehicle including a stator core with a plurality of slots and a multi-phase stator winding, wherein said multi-phase stator winding comprises a first winding disposed in a first circumference of said stator core and a second winding disposed in a second circumference inside said first circumference, each of said plurality of slots has a plurality of layers aligned in a radial direction, each of said first and second windings comprises a plurality of pairs of a large conductor segment and a small conductor segment surrounded by said large conductor segment respectively disposed in said plurality of layers, said large conductor segment includes a large turn portion disposed at one end of said stator core and each of a pair of conductor members extending therefrom through a pair of said slots spaced apart from each other to the other end of said stator core to connect said small conductor segments adjacent thereto, and said small conductor segment includes a small turn portion disposed at said one end of said stator core and each of a pair of conductor members extending therefrom through a pair of said slots spaced apart from each other to said other end of said stator core to connect large conductor segments adjacent thereto.

2. A stator as claimed in claim 1, wherein each of said plurality of conductor members has a rectangular cross-section in conformity with each of said slots.

3. A stator of an alternator for a vehicle including a stator core with a plurality of slots and a multi-phase stator winding, wherein said multi-phase stator winding comprises a first winding disposed in a circumference of said stator core and a second winding disposed along said first winding, each of said first and second windings comprises a plurality of pairs of a large turn portion disposed at one end of said stator core and a small turn portion surrounded by said large turn portion aligned in a radial direction at said one end of said stator core and conductor members respectively extending from said pairs of large and small turn portions to the other end of said stator core to be radially aligned in a pair of said slots spaced apart from each other, and said conductor members respectively extending from said small turn portion are connected to said conductor members adjacent thereto respectively extending from said large turn portion at said other end of said stator core.

4. A stator as claimed in claim 3, wherein each of said conductor members has a rectangular cross-section in conformity with each of said slots.

5. A stator of an alternator for a vehicle including a stator core with a plurality of slots and a multi-phase stator winding, wherein said multi-phase stator winding comprises a first winding disposed in a circumference of said stator core and a second winding disposed along said first winding, each of said first and second windings comprises a plurality of pairs of a large U-shaped segment and a small U-shaped segment surrounded by said large U-shaped segment aligned in the radial direction at one end of said stator core and conductor members respectively extending from said pairs of large and small U-shaped segments to be radially aligned in said slots, and said conductor members extending from said small U-shaped segment are respectively connected to said conductor members extending from said large conductor segments adjacent thereto.

6. A stator as claimed in claim 5, wherein each of said plurality of conductor members has a rectangular cross-section in conformity with each of said slots.

* * * * *